Patented Jan. 26, 1937

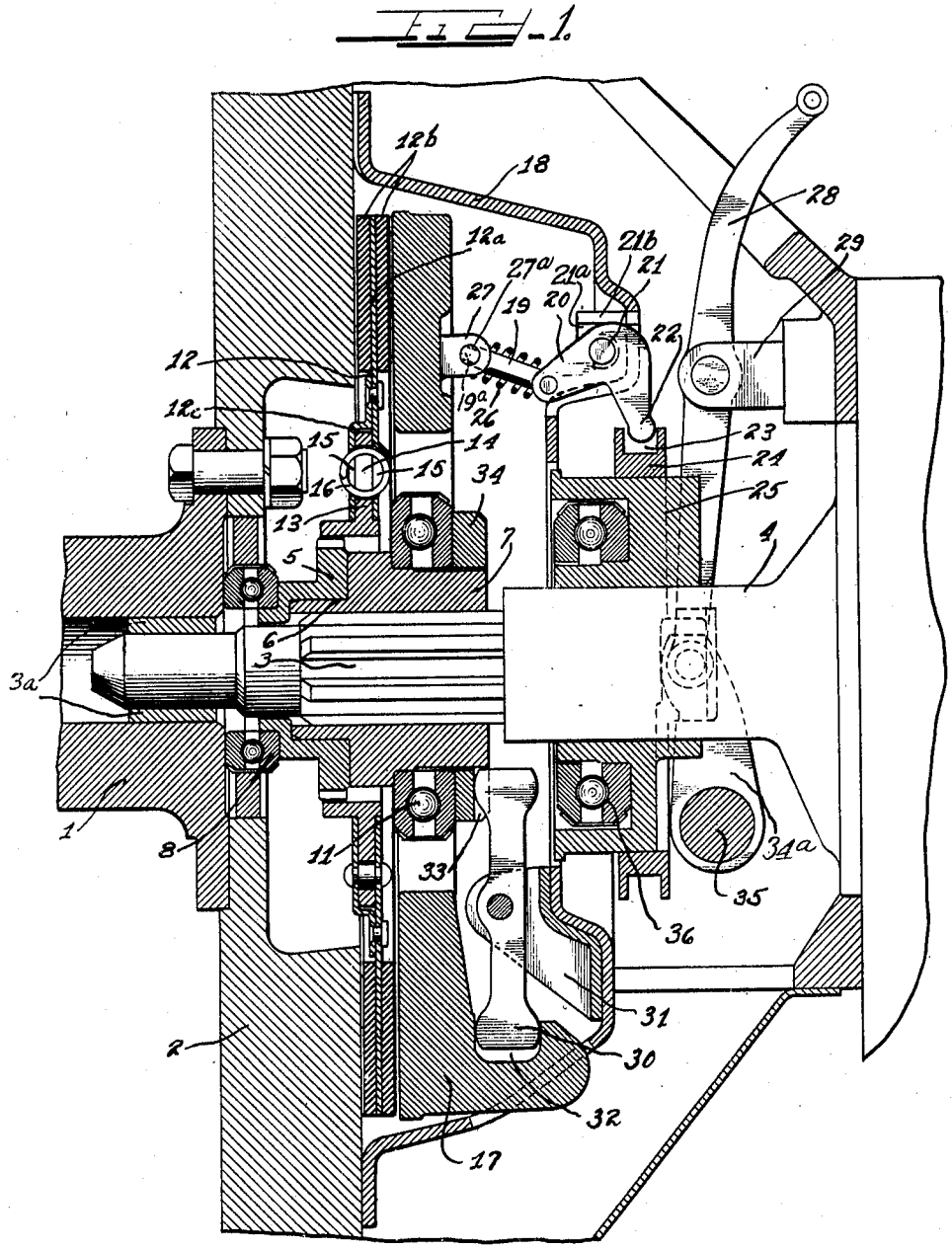

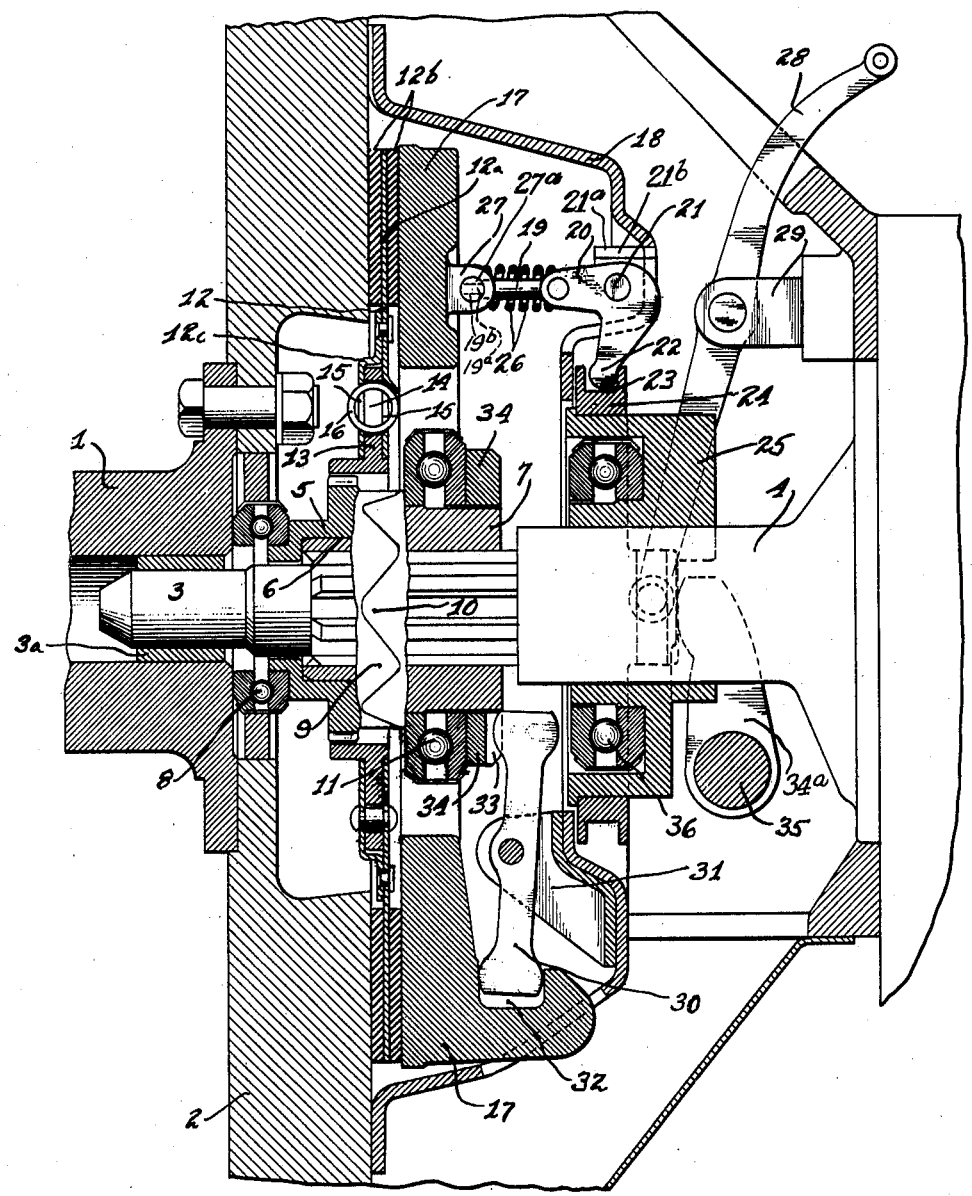

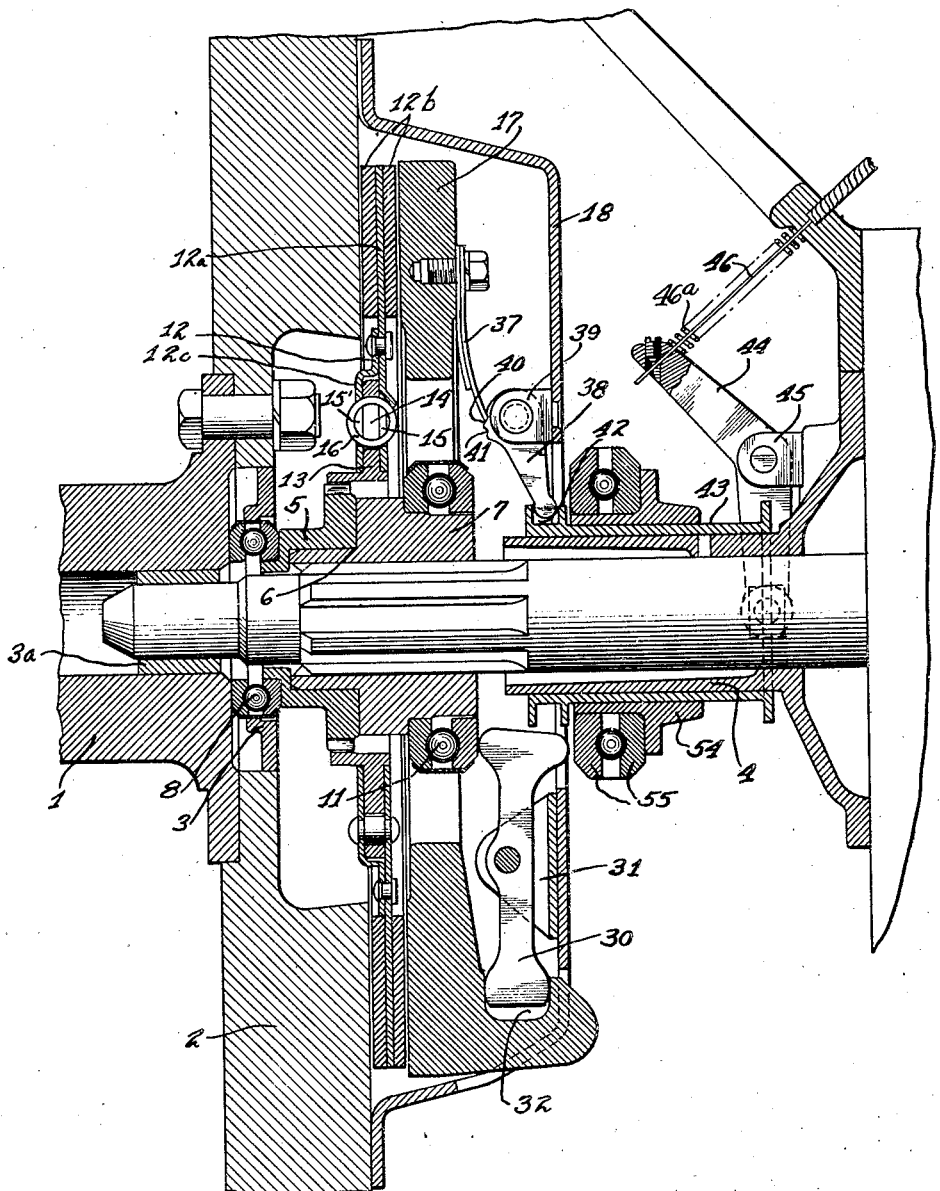

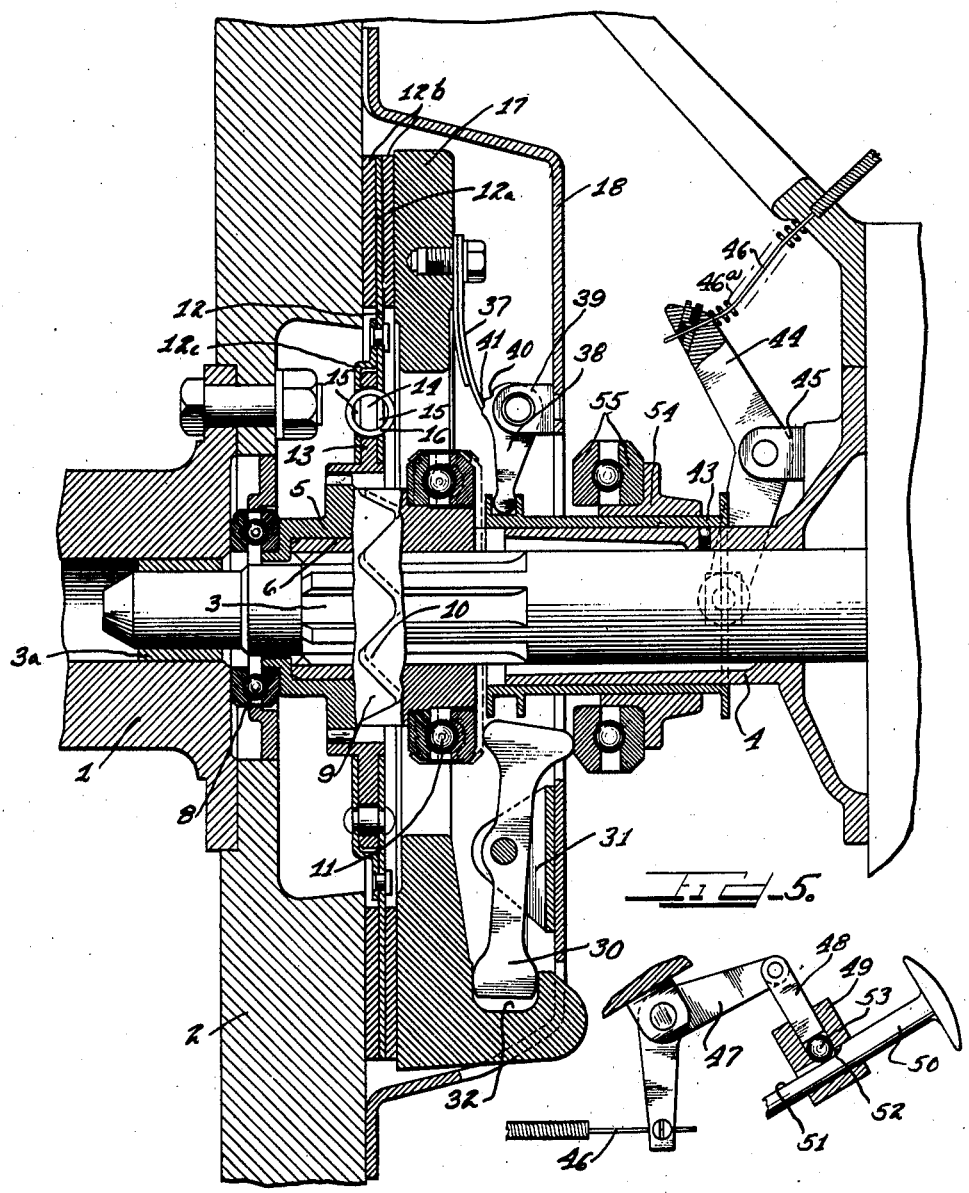

2,068,885

UNITED STATES PATENT OFFICE 2,068,885

AUTOMATIC CLUTCH

Kenneth E. Lyman, Rockford, Ill., and Harry J. Garceau, Muncie, Ind., assignors to Borg-Warner Corporation, Chicago, Ill., a corporation of Illinois Application January 14, 1933, Serial No. 651,724

5 Claims. (Cl. 192—52)

This invention relates to a friction clutch mechanism and concerns itself primarily with means for initially engaging the friction elements that constitute the clutch. More specifically, the invention involves a yielding toggle between one of the friction elements and the foot accelerator of a motor vehicle that is upon dead center when the friction elements are engaged and that q ickly snaps from its dead center position as soon as it is started by the accelerator lever for disengaging said friction element.

The invention comprises a novel structure and combination of parts hereinafter described and more particularly pointed out and defined in the appended claims.

In the accompanying drawings which illustrate certain preferred forms of this invention and in which similar reference numerals refer to similar features in the different views:

Figure 1 is a sectional view through an automatic clutch involving this invention illustrating the friction clutch elements in disengaged position.

Figure 2 is a view similar to Figure 1 but showing the clutch elements in engaged position.

Figure 3 is a sectional view through an automatic clutch illustrating a slightly modified form of the invention and showing the clutch elements in disengaged position.

Figure 4 is a view similar to Figure 3 illustrating the friction clutch elements in their initially engaged position.

Figure 5 is a part sectional and part elevational view of the connection between the clutch controlling means and the accelerator pedal.

In connection with this invention, there is illustrated in the different views, a driving member 1 which may be the engine shaft of an internal combustion engine which carries the usual fly wheel 2. The power of the driving member is transmitted through a driven member 3 which is journaled in a bearing 3a in the driving member 1 and in a bearing 4 which may be the bearing of a transmission casing or the like. A camming member 5 is loosely mounted in a reentrance angle 6 of a cam member 7 which is slidably splined upon the shaft 3. A thrust bearing 8 is preferably interposed between the end of the driving member 1 and the camming member 5. The camming member 5 and the cam member 7 have interengaging cam projections 9 and 10 with the result that when the cam member 5 is rotated relatively to the cam member 7, the latter will be shifted longitudinally for operating certain mechanism for increasing the pressure of the friction clutch elements as will later more fully appear. For engaging such mechanism, the cam member 7 carries a thrust ball bearing generally denoted by the reference numeral 11.

A friction element 12 is carried by the camming element 5. This friction element 12 comprises a friction plate 12b welded or secured to each side of a plate 12a and an attaching offset plate 12c that forms a groove with the plate proper 12a for receiving an annular member 13 which forms a part of the camming member 5 and which is shown as attached to such camming member by a suitable spline. The annular member 13 is provided with a slot 14 and the plate 12a and the offset plate 12c are provided with slots 15. A coil spring 16 is located in the slots and connects the friction element 12 with the ring member 13 for relative rotation with respect thereto to a limited extent. The friction element 12 is adapted to cooperate with the fly wheel 2 and also with a friction plate or friction element 17 which is carried by the casing 18 which is attached to the fly wheel.

Referring now especially to Figs. 1 and 2, it will be observed that a link member 19 is connected to an ear 27 upon the friction plate 17. Said link has an end 19a of reduced diameter slidably disposed within a transverse aperture 19b in a pin 27a, which is journalled in the ear 27. Link 19 is also pivoted to one end of a bell crank lever 20, which is pivoted at 21 to a lug 21a on the casing 18. The power arm 22 of the bell crank lever extends into a groove 23, which is formed in a slidable collar 24 mounted upon a bearing 25 surrounding the shaft bearing 4. A spring 26 surrounds the link 19 between the ear 27 and the lever 20, and is effective for breaking the toggle formed by the link 19 and the lever 20 when the same has been started downwardly beyond dead center for snapping the same into the position shown in Fig. 1 for separating the friction elements. Snapping of the toggle in the opposite direction is precluded by the horizontally projecting portion 21b of the lug 21a. In order to shift the sleeve 24, a lever 28 is pivoted intermediate its ends to a lug 29 on the casing and the lower end of this lever is suitably connected to the collar 24 whereby the operation of the lever will shift the collar 24 and actuate the toggle.

It will of course be understood that any number of toggle levers may be used for controlling the friction plate 17. It might be mentioned that the toggle is so designed that when it is extended as shown in Figure 2, the friction plates are initially engaged for rotation with the fly wheel. Increased pressure is adapted to be gradually applied to the friction elements through the mechanism now to be described:

Suitable levers 30 are pivoted intermediate their ends to lugs 31 on the casing 18. The outer ends of these levers (only one of which is shown) extend into sockets 32 formed in the friction plate 17. The inner ends of these levers extend into notches 33 formed in a ring 34 carried by the cam member 7 adjacent the thrust bearing 11 with the result that as the cam member 7 is shifted to the right, it will swing the lever 30 for gradually increasing the pressure upon the friction elements.

The bearing 25 is also adapted to be shifted for actuating the levers 30 for releasing the friction elements. This mechanism comprises a manually operated arm 34a which is secured to a shaft 35 and which engages the sleeve 25 for shifting the same to the left. Incidentally, the sleeve 25 carries a thrust bearing 36 which is adapted for engaging the levers 30. With this construction, it is possible to quickly disengage the friction elements at any desired time.

In the operation of this construction, it will be obvious that by sliding the ring 24 to the left, the toggle will be straightened out from the position shown in Fig. 1 to the position shown in Fig. 2 and the friction plates will be initially engaged for causing the driven member to rotate with the driving member. At the same time the cam member 5 will shift the cammed member 7 through parts 9 and 10 for actuating the levers 30 for increasing the frictional engagement of the friction elements.

Referring now to Figures 3 and 4, it will be observed that a slightly different toggle mechanism has been employed for initially applying the friction elements. This toggle mechanism comprises a spring 37 which is fastened to the friction plate 17 at one end. The other end of the spring 37 engages a lever 38 which is pivoted to a lug 39 carried by the casing 18. This lever 38 has a notch 40 for receiving the free end of the spring 37 when the friction elements are in disengaged position, and a notch 41 for engaging the end of said spring when the friction plates are initially applied as shown in Figure 4. The lower end of the lever 38 engages a groove 42 which is formed in a slidable sleeve 43 surrounding the aforementioned bearing 4. The sleeve 43 is adapted to be shifted by an elbow shaped lever 44 which is pivoted to a bracket 45 attached to the bearing 4. The lower end of the lever 44 is suitably attached to the sleeve 43 while the upper end thereof is connected with a flexible rod 46 which is attached to a bell crank lever 47 as shown in Figure 5. A coiled expansion spring 46a surrounding the flexible member 46 normally holds the lever 44 rotated into the position illustrated in Fig. 3. The bell crank lever 47 is connected with a link 48 which extends into a bearing 49 through which the accelerator pedal 50 extends. The accelerator pedal 50 has a reduced portion upon its stem as indicated at 51 and this reduced portion terminates in a curved cam 52. A spherical element 53 is interposed between the end of the link and the reduced portion of the pedal stem 50. When the accelerator pedal stem is depressed, the spherical element 53 will be forced outwardly against the link 48 for swinging the bell crank lever 47 and pulling upon the rod 46 for actuating the lever 44 and shifting the sleeve 43 forwardly for initially applying the friction elements as will be obvious.

A sleeve 54 is slidably mounted upon the sleeve 43 and is equipped with a thrust bearing generally denoted by the reference numeral 55. This sleeve 54 is adapted to be manually shifted for actuating the levers 30 for releasing the friction elements. In this modified form of the invention, the lever 30 is adapted to be actuated by the thrust bearing 11 when the cammed member 7 is shifted to the right. This actuation of the levers 30 will gradually increase the friction of the clutch elements.

In the operation of this modified form of the invention, it will be apparent that when the sleeve 43 is shifted toward the left, the turning movement of the lever 38 will force the spring 37 and hence the friction plate 17 to the left and then as soon as the lever 38 has turned sufficiently to bring the lower end of the spring 37 adjacent the notch 41, the spring will immediately snap into such notch and tend to rotate the lever until it is firmly seated in such notch. In this position of the parts, the friction plates will be initially engaged as shown in Fig. 4, and the rotation of the driving and driven members will cause cam member 5 to shift cammed member 7 through parts 9 and 10 for actuating levers 30 for increasing the intensity of engagement of the friction plates.

From the foregoing, it will be apparent that a novel means has been provided for initially applying the friction elements, and which means is susceptible of very easy and quick operation so that very little time and effort are lost in the initial operation.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In a friction clutch, a driving member having a flywheel, a driven member in axial alinement with the driving member, a camming member loosely mounted upon said driven member, a friction member carried by said camming member for engaging said flywheel, a cammed member splined upon the driven member and adapted to be shifted longitudinally of said driven member by said camming member, a casing attached to said flywheel, a lever pivoted to said casing, means for operating said lever, a friction plate cooperating with said friction member, a connection between said friction plate and lever effective for causing a turning movement of said lever when the same is started from its operative to its inoperative position, and means actuated by said cammed member for actuating said friction plate.

2. In a friction clutch mechanism, a driving shaft, a flywheel thereon, a driven shaft in axial alinement with said driving shaft, a camming member loosely mounted upon said driven shaft, a friction member supported upon said camming member for engaging said flywheel, a friction plate for engaging said friction member, a cammed member splined upon the driven shaft and adapted to be actuated by said camming member, means for initially engaging said friction plate and friction member comprising a support, a lever pivoted upon said support, a connection between said lever and friction plate, yielding means acting upon said lever, manually operated means for operating said lever, and means for increasing the initial friction between said plate and friction member comprising a lever actuated by said cammed member and engaging said friction plate.

3. In a friction clutch, a driven member, a driven cam having limited movement on said member, a driving cam movable on said member and actuative coincidental with a movement thereof to move the driven cam, a driven friction element adapted to drive said driving cam, a driving friction element movable into pressing engagement with the driven element to drive the latter, means for increasing the pressure between said friction elements and actuated by said driven cam incident to such limited movement thereof, and manual means for initially engaging said friction elements, said manual means including a linkage advanceable for moving said driving friction element into engagement with the driven friction element and retractable into an inoperative position, yieldable means tending to hold said linkage retracted, and tension means in operable connection with the linkage for advancing the same.

4. A friction clutch comprising a driven rotatable member, a driven cam on and movable axially of said member, a driving cam movable rotatively of said driven member and actuative pursuant to such movement to move the driven cam, a driven friction element adapted to drive said driving cam, a driving friction element engageable with said driven element, means for developing pressure between said friction elements and actuated by said driven cam incident to such movement thereof, and manually operated means for initially engaging said friction elements, said manual means including a linkage advanceable for moving said driving friction element into engagement with the driven friction element and retractable into an inoperative position, yieldable means tending to hold said linkage retracted, and tension means in operable connection with the linkage for advancing the same.

5. A friction clutch comprising driving and driven members, complemental friction elements having a counterpart on each of said members, said elements being adapted for an initial engagement and a final engagement of increased pressure and the element on said driven member having limited rotative movement relatively thereto, means in operative connection with said element for automatically effecting the final engagement between said elements pursuant to such relative movement, said means including a driven cam movable axially of said clutch and a complemental cam limitedly rotatable with said driven element relative to said driven shaft, a linkage advanceable to exert a pressure on one of said friction elements to cause initial engagement and retractable into an inoperative position, yieldable means tending to hold said linkage retracted, and manually operable tension means in operable connection with the linkage for advancing the same against the resistance offered by said yielding means.

KENNETH E. LYMAN.
HARRY J. GARCEAU.